(12) United States Patent
Hasegawa et al.

(10) Patent No.: US 9,374,271 B2
(45) Date of Patent: Jun. 21, 2016

(54) FIELD DEVICE, COMMUNICATION SYSTEM, AND METHOD FOR CONTROLLING FIELD DEVICE

(71) Applicant: YOKOGAWA ELECTRIC CORPORATION, Musashino-shi, Tokyo (JP)

(72) Inventors: Kenji Hasegawa, Musashino (JP); Toshiyuki Emori, Musashino (JP); Masahiro Sakai, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 10 days.

(21) Appl. No.: 14/331,292

(22) Filed: Jul. 15, 2014

(65) Prior Publication Data
US 2015/0024797 A1  Jan. 22, 2015

(30) Foreign Application Priority Data
Jul. 17, 2013 (JP) .................. 2013-148666

(51) Int. Cl.
G08B 23/00 (2006.01)
H04L 12/24 (2006.01)
H04L 12/26 (2006.01)
G05B 19/042 (2006.01)
H04L 29/08 (2006.01)
H04W 84/10 (2009.01)
H04W 88/02 (2009.01)

(52) U.S. Cl.
CPC ........ *H04L 41/0668* (2013.01); *G05B 19/0421* (2013.01); *H04L 41/0618* (2013.01); *H04L 43/065* (2013.01); *G05B 2219/25323* (2013.01); *G05B 2219/25428* (2013.01); *H04L 67/12* (2013.01); *H04W 84/10* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 6,023,399 A * | 2/2000 | Kogure | ............. | G05B 19/0421 361/115 |
| 8,200,783 B2 * | 6/2012 | Eryurek | ............. | G05B 19/0426 709/210 |
| 8,719,468 B2 * | 5/2014 | Keul | .................. | H04L 12/44 700/1 |
| 2003/0236579 A1 * | 12/2003 | Hauhia | ............. | G05B 19/0428 700/79 |
| 2005/0125085 A1 * | 6/2005 | Prasad | ............... | G05B 19/0423 700/83 |
| 2005/0276153 A1 * | 12/2005 | Gordon | ............... | B28C 5/003 366/6 |
| 2006/0148410 A1 * | 7/2006 | Nelson | .................. | G01D 3/08 455/67.11 |
| 2006/0221993 A1 * | 10/2006 | Liao | .................... | H04W 74/06 370/449 |
| 2007/0010968 A1 * | 1/2007 | Longsdorf | ............. | G08C 19/02 702/183 |
| 2007/0043539 A1 * | 2/2007 | Niina | ................ | G05B 23/0245 702/188 |
| 2007/0078980 A1 | 4/2007 | Tomita et al. | | |
| 2007/0088528 A1 * | 4/2007 | Miller | ................ | G05B 23/024 702/185 |

(Continued)

FOREIGN PATENT DOCUMENTS

DE  10 2004 048 766 A1  4/2006
DE  10 2004 048 766 A1  6/2006

(Continued)

*Primary Examiner* — Dominic Rego
(74) *Attorney, Agent, or Firm* — Sughrue Mion, PLLC (57) ABSTRACT

A communication system includes a plurality of field devices connected to a field network, and a controller configured to communicate with the field devices via the field network to control the field devices. The field device is configured to communicate with the controller via the field network, and to perform a predetermined processing using information obtained by a communication between the field devices via a local network.

20 Claims, 3 Drawing Sheets

(56) References Cited

U.S. PATENT DOCUMENTS

| | | | |
|---|---|---|---|
| 2007/0131768 A1* | 6/2007 | Wakabayashi | G06K 7/084 235/449 |
| 2007/0270177 A1 | 11/2007 | Nagashima et al. | |
| 2008/0122611 A1 | 5/2008 | Nagashima et al. | |
| 2008/0274766 A1* | 11/2008 | Pratt | G01D 21/00 455/552.1 |
| 2009/0010203 A1* | 1/2009 | Pratt, Jr. | H04L 12/66 370/328 |
| 2009/0016462 A1 | 1/2009 | Da Silva Neto | |
| 2010/0149997 A1* | 6/2010 | Law | G05B 19/4185 370/248 |
| 2010/0198032 A1* | 8/2010 | Simpson | A61B 5/0002 600/365 |
| 2011/0216695 A1* | 9/2011 | Orth | H04W 40/00 370/328 |
| 2012/0161978 A1* | 6/2012 | Sakurai | H04L 41/0813 340/870.02 |
| 2013/0002229 A1* | 1/2013 | Seiler | G05B 13/025 323/318 |
| 2013/0107919 A1* | 5/2013 | Burns | H04L 27/10 375/219 |
| 2013/0146635 A1* | 6/2013 | Hedrick | A45F 5/00 224/600 |
| 2013/0151020 A1* | 6/2013 | Manninen | G05B 21/02 700/282 |
| 2013/0227575 A1* | 8/2013 | Jensen | G05B 23/0256 718/102 |
| 2013/0273072 A1* | 10/2013 | Tesar | C07K 16/2896 424/158.1 |
| 2013/0291085 A1* | 10/2013 | Chong | G05B 19/048 726/10 |
| 2013/0304238 A1* | 11/2013 | Seyller | G05B 19/0428 700/79 |
| 2014/0269744 A1* | 9/2014 | Flanders | G05B 19/4185 370/401 |
| 2014/0280678 A1* | 9/2014 | Nixon | G06F 15/17331 709/213 |
| 2014/0282257 A1* | 9/2014 | Nixon | G05B 11/01 715/835 |
| 2014/0364963 A1* | 12/2014 | Lovell | G06K 19/07758 700/2 |

FOREIGN PATENT DOCUMENTS

| | | |
|---|---|---|
| EP | 1 862 877 A1 | 12/2007 |
| JP | 2002-62933 A | 2/2002 |
| JP | 2005216148 A | 8/2005 |
| JP | 2006-39892 A | 2/2006 |
| JP | 2009-48289 A | 3/2009 |
| JP | 4399773 B2 | 1/2010 |
| WO | 2004/029895 A2 | 4/2004 |
| WO | 2005/050336 A1 | 6/2005 |
| WO | 2006022300 A1 | 3/2006 |

* cited by examiner

FIELD DEVICE, COMMUNICATION SYSTEM, AND METHOD FOR CONTROLLING FIELD DEVICE

BACKGROUND OF THE INVENTION

1. Field of the Invention

The present invention relates to a field device, a communication system, and a method for controlling a field device.

Priority is claimed on Japanese Patent Application No. 2013-148666, filed Jul. 17, 2013, the contents of which are incorporated herein by reference.

2. Description of Related Art

In a plant or a factory or the like (hereinafter, collectively referred to as a plant), a distributed control system (DCS), in which on-site devices (measuring instruments, actuators, displays, and alarms) called field devices and control apparatuses to provide control thereof are connected via a communication means, is configured to implement a high level of automated operation. Almost the field devices which constitute such a distributed control system have been performed a cable communication. Recently, field devices for a wireless communication, which meets an industrial wireless communication standard such as ISA100.11a and Wireless HART (registered trademark), are also implemented.

Recently, there have been increased cases that a plant asset management (PAM) system is configured in order to maximize an efficiency of a plant, in addition to the distributed control system described above. The plant asset management system is for operating a plant under optimum efficiency conditions in consideration of information obtained from the field device described above and the like, and operation parameters of the plant and accounting information (raw material expenses, sales price of products, and the like).

Examples of distributed control system of the related art are disclosed in Japanese Patent No. 4399773, PCT International Publication No. WO 2005/050336, and United States Patent Application, Publication No. 2007/0078980. Specifically, these patent publications disclose a distributed control system in which a plurality of field devices and a controller are connected to a network, the controller obtains measurement results from a field device which is a measuring instrument (a flow gauge, a thermometer, and the like), and the controller controls a field device which is an actuator (a valve and the like) based on the measurement results.

Most of the field devices of the related art used in the distributed control systems and the plant asset management systems described above have only the ability to perform basic functions such as a function of transmitting measurement results of, for example, a flow rate or temperature, and a function of adjusting a valve opening and the like under the control of controller (control device). However, recent field devices are digitized and have intelligent functions. Therefore, the number of field devices having additional functions (for example, a self-diagnosis function which is a function of diagnosing one's own condition) in addition to the basic functions described above, have been increasing.

If field devices are digitized and have intelligent functions, in addition to information obtained by the basic functions described above, a variety and large amount of information are obtained from the field devices. For example, information indicating the current state of the field device is obtained from the field device having the self-diagnosis function described above. If such information is obtained, for example, the abnormal of the field device can be promptly detected. Therefore, obtaining such information is thought to be desirable for the safe and efficient operation of a plant. However, if the amount of information obtained from the field device becomes huge, there are cases in which the load of a controller greatly increases.

In the distributed control system described above, all of the measurement results measured by the field devices are collected in the controller, and the controller centrally controls the field devices based on the collected measurement results. Therefore, if a communication failure between the controller and the field device occurs, there are cases in which the controller cannot obtain the measurement results from the field devices and control the field devices. The plant asset management system also operates the plant under optimum efficiency conditions using the information obtained from the field device. Therefore, if a communication failure occurs, there are cases in which the plant asset management system cannot operate the plant under optimum efficiency conditions.

SUMMARY OF THE INVENTION

One aspect of the present invention provides a field device, which is configured to transmit information to and receive information from other field devices and to process the information to reduce the load of a control device and avoid a communication failure, a communication system including the field device, and a method for controlling the field device.

A field device according to one aspect of the present invention may include a communicator configured to communicate with a control device via a first communication path, a local communicator configured to communicate with other field device via a second communication path, which is different from the first communication path, and a processor configured to perform a predetermined information processing using at least one of first information related to the field device itself and second information obtained by communication between the local communicator and other field device via the second communication path.

In the field device described above, the local communicator may configured to communicate with other field device by at least one of cable communication and wireless communication.

In the field device described above, the processor may be configured to perform a diagnosis processing as the predetermined processing. The diagnosis processing may diagnose a state of at least one of the field device itself and other field device using at least one of the first information and the second information.

In the field device described above, the processor may be configured to perform a separation processing as the predetermined processing. The separation processing may separate alarms generated by at least one of the field device itself and other field device using at least one of the first information and the second information.

In the field device described above, the processor may be configured to perform the predetermined processing at constant time intervals.

The field device described above may further include a controller configured to control the communicator to transmit processing results of the processor to the control device via the first communication path.

In the field device described above, if the communicator fails to communicate with the control device via the first communication path, the controller may be configured to control the local communicator to communicate with the control device via other field device.

A communication system according to one aspect of the present invention may include a plurality of field devices and a control device configured to communicate with the field devices to control the field devices. Each field device may include a communicator configured to communicate with the control device via a first communication path, a local communicator configured to communicate with other field device via a second communication path, which is different from the first communication path, and a processor configured to perform a predetermined information processing using at least one of first information related to the field device itself and second information obtained by communication between the local communicator and other field device via the second communication path. The control device may be configured to communicate with the field devices via the first communication path.

In the communication system described above, the local communicator may be configured to communicate with other field device by at least one of cable communication and wireless communication.

In the communication system described above, the processor may be configured to perform a diagnosis processing as the predetermined processing. The diagnosis processing may diagnose a state of at least one of the field device itself and other field device using at least one of the first information and the second information.

In the communication system described above, the processor may be configured to perform a separation processing as the predetermined processing. The separation processing may separate alarms generated by at least one of the field device itself and other field device using at least one of the first information and the second information.

In the communication system described above, the processor may be configured to perform the predetermined processing at constant time intervals.

In the communication system described above, each field device may further include a controller configured to control the communicator to transmit processing results of the processor to the control device via the first communication path.

In the communication system described above, if the communicator fails to communicate with the control device via the first communication path, the controller may be configured to control the local communicator to communicate with the control device via other field device.

A method for controlling a field device according to one aspect of the present invention may include transmitting and receiving information among a plurality of field devices via a first network connecting the field devices, performing a predetermined processing in each field device using at least one of first information related to the field device itself and second information from other field devices obtained by the transmittance and receiving of the information among the field devices, and transmitting processing results of the predetermined processing from each field device to a control device via a second network connecting each field device and the control device.

In the method described above, the transmittance and receiving of the information among the field devices may be performed by at least one of cable communication and wireless communication.

In the method described above, the predetermined processing may include a diagnosis processing diagnosing a state of at least one of the field device itself and other field device using at least one of the first information and the second information.

In the method described above, the predetermined processing may include a separation processing separating alarms generated by at least one of the field device itself and other field device using at least one of the first information and the second information.

In the method described above, the predetermined processing may be performed at constant time intervals.

In the method described above, if a direct communication via the second network connecting one of the field devices and the control device is failed, communication between the one of the field devices and the control device via other field device may be performed.

According to one aspect of the present invention, a field device includes a local communicator configured to communicate with other field device via a second communication path, which is different from a first communication path for communicating a control device, and a processor configured to perform a predetermined information processing using information obtained by communication between the local communicator and other field device via the second communication path. Therefore, the field devices can transmit and receive information each other and process the information. This provides the effect of enabling reduction of the load of the control device and avoidance of a communication failure.

DETAILED DESCRIPTION OF THE INVENTION

Figure 1:
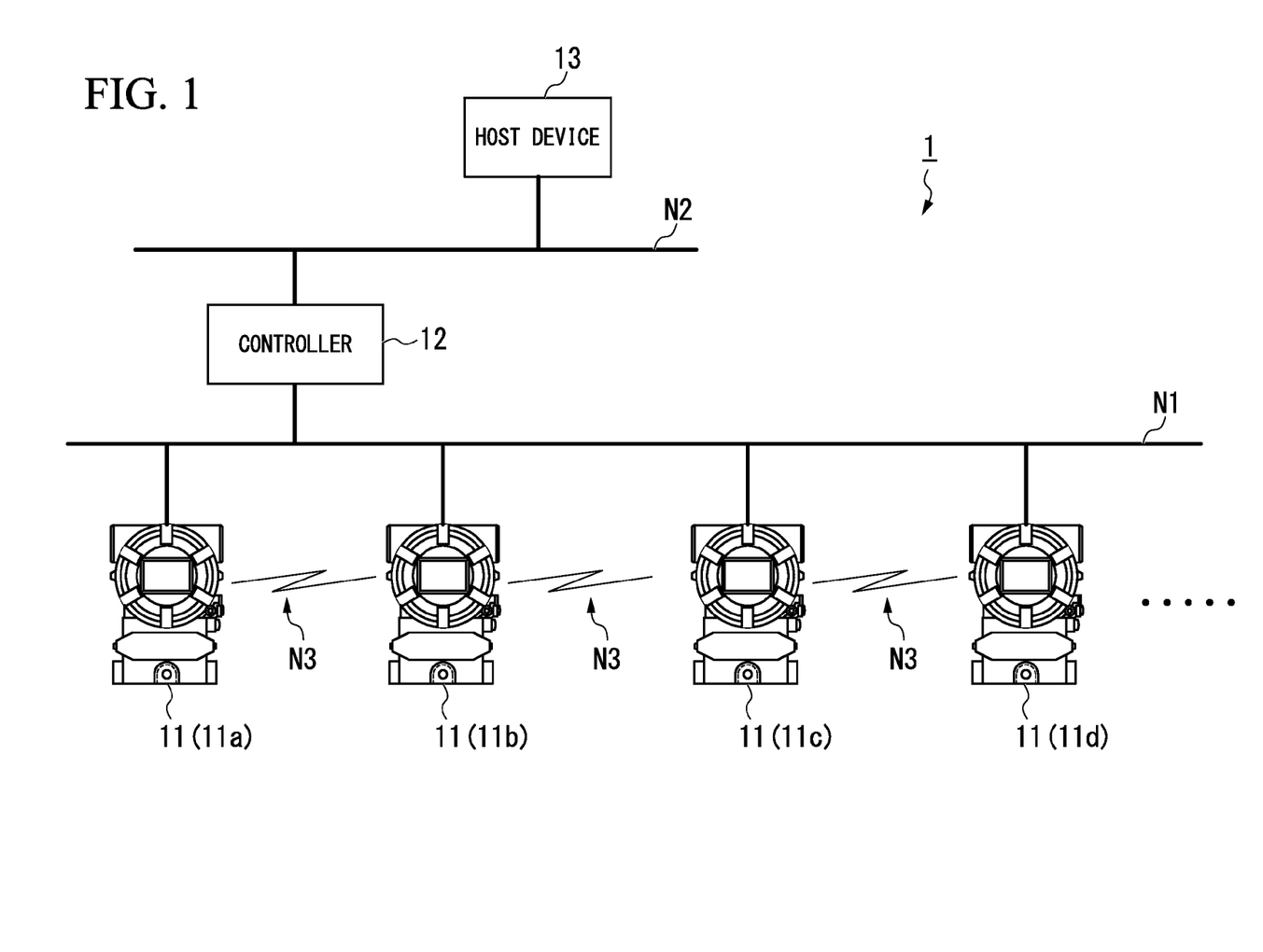
FIG. 1 is a block diagram showing the overall constitution of a communication system according to an embodiment of the present invention.

A field device and a communication system according to an embodiment of the present invention will be described in detail below, with references made to the drawings. FIG. 1 is a block diagram showing the overall constitution of a communication system according to the embodiment of the present invention. As shown in FIG. 1, a communication system 1 according to the embodiment of the present invention includes a plurality of field devices 11, a controller 12, and a host device 13. The field devices 11, the controller 12, and the host device 13 communicate a variety of information to each other.

For simplicity, in FIG. 1, only four field devices 11 are shown, but the number of the field devices 11 is arbitrary. Hereinafter, to distinguish between the four field devices 11 shown in FIG. 1, the four field devices 11 are indicated by "field device 11a", "field device 11b", "field device 11c", and "field device 11d".

The field device 11 and the controller 12 are connected to a field network N1 (a first communication path, a communication network). The controller 12 and the host device 13 are connected to a control network N2. The field devices 11 are connected to the field network N1 described above, and are connected to each other via a local network N3 (a second communication path).

The field network N1 is, for example, a cable network laid throughout on-site in a plant. On the other hand, the control network N2 is, for example, a cable network connecting the on-site within the plant and a monitoring room. The field network N1 and the control network N2 may be wireless networks. The local network N3 is, for example, a wireless network provided in the on-site within the plant. The local network N3 is provided to realize communication among the field devices 11 without the field network N1. The local network N3 may be a cable network.

The field device 11 is a sensor device such as a flow gauge or a temperature sensor, a valve device such as a flow control valve or open/close valve, an actuator device such as a fan or motor, or other device installed on-site within the plant. A plurality of field devices 11 are installed in the plant, and each is managed (controlled) centrally by the controller 12. The field devices 11 communicate each other via the local network N3, and perform a predetermined processing using obtained information. Details of these field devices 11 will be described later.

The controller 12 collects measurement data from the field device 11 (for example, the field device 11a) while being monitored by the host device 13 and controls the field device 11 (for example, the field device 11d) based on the collected measurement data. The host device 13, for example, is operated by an operator in the plant and used for monitoring a process. Specifically, the host device 13 monitors and manages the controller 12 via the control network N2 and, in accordance with the result of that monitoring and the like (or in accordance with an instruction from an operator) controls the controller 12. The host device 13 includes a function for implementing a plant asset management system, which operates the plant under optimum efficiency conditions.

Figure 2:
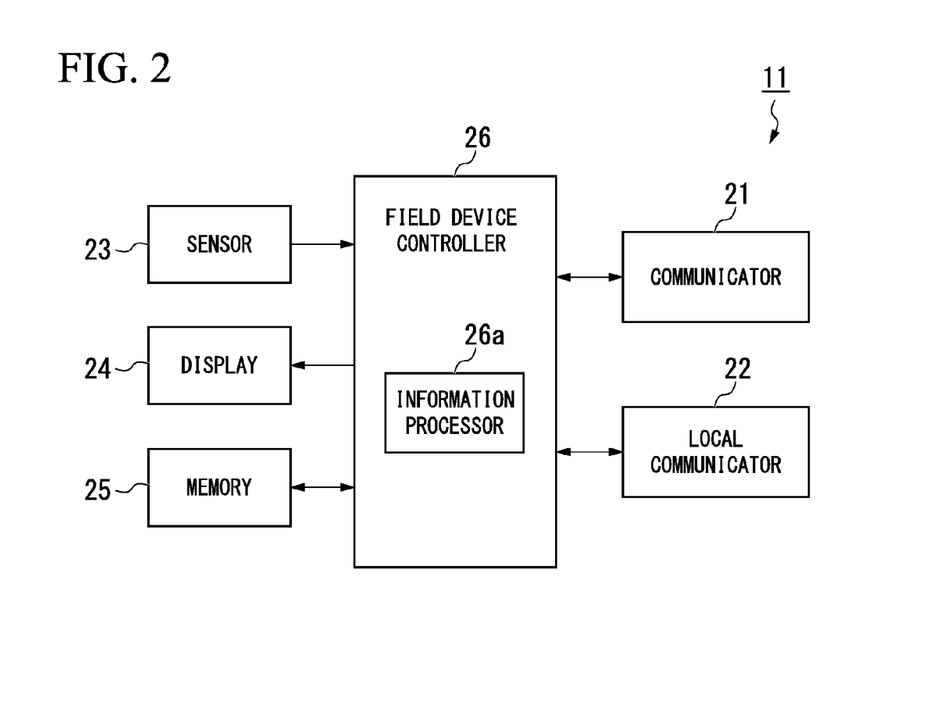
FIG. 2 is a block diagram showing main parts of the constitution of a field device according to the embodiment of the present invention.

FIG. 2 is a block diagram showing main parts of the constitution of the field device according to the embodiment of the present invention. As described above, the field device 11 includes a variety of devices such as a measurement sensor device and a valve device for performing open/close of valve. To facilitate understanding of the following description, a description will be provided for the case in which the field device 11 is a sensor device. As shown in FIG. 2, the field device 11 includes a communicator 21, a local communicator 22, a sensor 23, a display 24, a memory 25, and a field device controller 26.

The communicator 21 communicates with the controller 12 via the field network N1 under the control of the field device controller 26. The local communicator 22 communicates with other field devices 11 via the local network N3 under the control of the field device controller 26. For example, the local communicator 22 provided in the field device 11a communicates with the local communicator 22 provided in the field device 11b via the local network N3, and the local communicator 22 provided in the field device 11b communicates with the local communicators 22 provided in the field devices 11a and 11c via the local network N3. The local communicator 22 performs a wireless communication, which meets an industrial wireless communication standard such as ISA100.11a or Wireless HART (registered trademark).

The sensor 23 measures a measurement target under the control of the field device controller 26. For example, if the field device 11 is a flow gauge, the sensor 23 is installed on a pipe in which the fluid, which is a measurement target, flows, and measures the flow rate of fluid flowing through the pipe under the control of the field device controller 26. The display 24 includes a display device such as a liquid crystal display device, and displays a variety of information under the control of the field device controller 26. For example, the display 24 displays measurement results of the sensor 23, information indicating the internal state of the field device 11, and a variety of other information.

The memory 25 is a volatile memory such as a RAM (random access memory), or a non-volatile memory such as a flash ROM (read-only memory) or EEPROM (electrically erasable and programmable ROM). The memory 25 stores the measurement results of the sensor 23, and a variety of information obtained by the communication of the local communicator 22 with other field devices 11.

The information obtained by other field devices 11 and stored in the memory 25 includes, for example, diagnostic information of each field device 11 (details of the diagnostic information will be described later), information indicating the measurement results of the sensor 23 at each field device 11, and statistical information stored in each field device 11. In addition to the information described above, the information obtained by other field devices 11 and stored in the memory 25 includes information indicating an alarm generated by each field device 11.

The field device controller 26 centrally controls the operation of the field device 11. For example, the field device controller 26 controls the sensor 23 to measure the measurement target (for example, a flow rate of fluid), controls the communicator 21 to transmit the measurement results of the sensor 23 to the controller 12, and controls the display 24 to display the measurement results of the sensor 23. The field device controller 26 controls the local communicator 22 to communicate with other field devices 11 via the local network N3, and to transmit and receive a variety of information including alarms. The communication among the field devices 11 via the local network N3 is performed at constant time intervals in synchronization or in non-synchronization. The communication via the local network N3 is performed among pre-registered field devices 11.

If the field device controller 26 fails to control the communicator 21 to communicate with the controller 12 via the field network N1, the field device controller 26 controls the local communicator 22 to communicate with the controller 12 via other field device 11. In other words, if the field device controller 26 cannot communicate with the controller 12, the field device controller 26 judges that failures occur in the communicator 21 or the field network N1. Then, the field device controller 26 communicates with the controller 12 via the local network N3 and other field device 11.

The field device controller 26 includes an information processor 26a, which performs predetermined processing using a variety of information obtained from other field devices 11 via the local network N3. Specifically, the information processor 26a performs a self-diagnosis processing, a mutual-diagnosis processing, a separation processing of alarms, and the like. The self-diagnosis processing described above diagnoses an abnormal state of a circuit and function in a single device using only information (first information), which is obtained by the single device and related to the single device. On the other hand, the mutual-diagnosis processing described above makes the plurality of field devices 11 connected to each other via the local network N3 share information with each other, and each device diagnoses abnormal states of itself and other field devices using the shared information (first and second information). The mutual-diagnosis processing can perform a higher level of diagnosis than the self-diagnosis processing.

The diagnosis using the self-diagnosis processing described above includes, for example, an impulse line blockage diagnosis of a differential pressure transmitter, an electrode adhesion diagnosis of an electromagnetic flow meter, a diagnosis of a detector and circuit in own device, a process diagnosis around own device, and online diagnosis.

The mutual-diagnosis processing described above can diagnose whether or not an abnormal state occurs in the process in addition to the diagnosis of the abnormal of own device and other field devices. For example, the mutual-diagnosis processing can perform a diagnosis of corrosion, wastage, and adhesion of a pipe and tank and the like, a diagnosis of occurrence of a cavitation and water hammering, and a diagnosis of occurrence of a leaking and diffusion of gas into a circumference. The separation processing of alarms described above separates alarms generated by a single device itself or alarms obtained from other field devices 11 in accordance with the importance or kind of alarms.

The functions of the field device controller 26 described above (the information processor 26a) can be realized using hardware, but can be also realized using software. In other words, the functions of the field device controller 26 may be realized by executing a program, which realizes the functions of the information processor 26a, on CPU (a central processing unit: not shown) provided in the field device 11. For example, the functions of the information processor 26a can be realized using software by incorporating (downloading) a program, which realizes the functions of the information processor 26a, from a computer connected to the field device 11 into the field device 11, installing the program into the field device 11, and executing the program. When the program is stored in a non-transitory computer-readable storage medium and the program is executed by a processor of the field device 11, the program can realize the functions of the information processor 26a. Specifically, when the program is executed by the processor of the field device 11, the program can realize a predetermined processing such as a self-diagnosis processing, a mutual-diagnosis processing, or a separation of alarms using a variety of information obtained from other field devices via the local network N3. If the functions of the field device controller 26 (the information processor 26a) are realized using system including a programmed processor, the processor is programmed to perform a predetermined processing such as the self-diagnosis processing, the mutual-diagnosis processing, and the separation of alarms using a variety of information obtained from other field devices 11 via the local network N3.

Hereinafter, operations of the communication system in the configuration described above will be described. The operations of the communication system 1 include an operation that the controller 12 controls the field device 11 with reference to the measurement data from the field device 11 (basic operation) and an operation that a variety of information transmitted and received among the field devices 11 is preliminarily processed and the processed information is transmitted to the controller 12 (preprocessing operation). Hereinafter, these basic operation and preprocessing operation will be described in sequence.

(Basic Operation)

During the operation of the communication system 1, in each field device 11 a to 11d, the field device controller 26 controls the sensor 23 to measure quantity of state (for example, a flow rate of fluid) in an industrial process. The measurement data, which is the result of the sensor 23, is temporarily stored in the memory 25, then, is read out by the communicator 21. Then, the field device controller 26 controls the communicator 21 to transmit the measurement data to the controller 12 via the field network N1.

When the controller 12 receives the measurement data from the field devices 11 a to 11d, a process for obtaining an actuation amount of the field device 11 (for example, the field device 11d) based on the measurement data is performed. The control data indicating the actuation amount is transmitted to the field device 11 (for example, the field device 11d) via the field network Nl. Thereby, the field device 11 (for example, the field device 11d) receives the control data from the controller 12, then, the field device 11 operates based on the control data (for example, an adjustment of valve opening and the like). In the communication system 1, these operations are repeated at constant time intervals.

(Preprocessing Operation)

Figure 3:
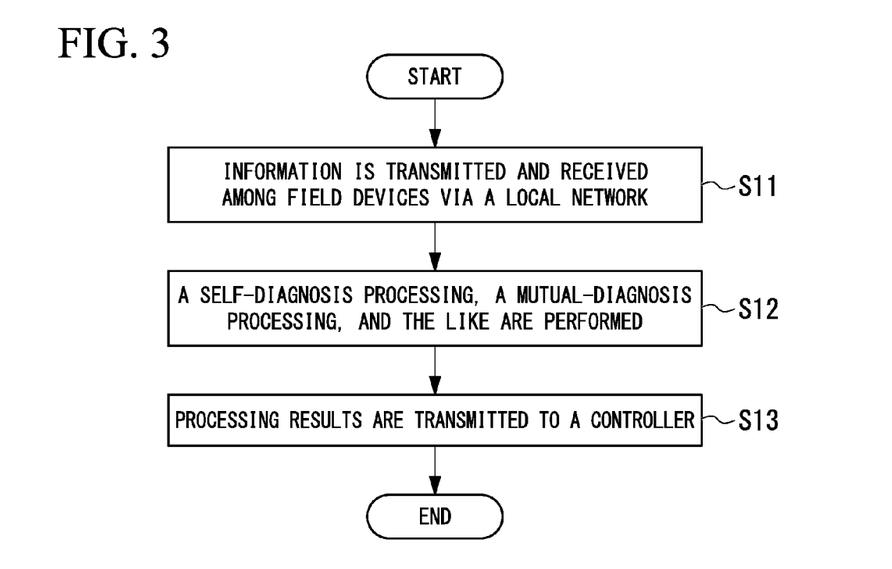
FIG. 3 is a flowchart showing an example of a preprocessing operation in a communication system according to the embodiment of the present invention.

FIG. 3 is a flowchart showing an example of preprocessing operation in the communication system according to the embodiment of the present invention. The processes shown in the flowchart of FIG. 3 are repeated at constant time intervals independently from the basic operation described above. At the start of the processes shown in the flowchart of FIG. 3, in each field device 11a to 11d, the field device controller 26 first instructs the local communicator 22 to perform communication with the field devices 11a to 11d via the local network N3. Thereby, a variety of information is transmitted and received among the field devices 11a to 11d, and the variety of information is stored in the memory 25. Thereby, the information is shared among the field devices 11a to 11d (step S11).

Next, in each field device 11a to 11d, the field device controller 26 reads out the information stored in the memory 25, the information processor 26a then performs the self-diagnosis processing, the mutual-diagnosis processing, the separation of alarms, and the like (the preprocessing operation) (step S12). By performing these processes, each field device 11a to 11d detects an abnormal state of a circuit and function in itself or abnormal states of itself and other field devices 11.

Subsequently, in each field device 11a to 11d the field device controller 26 controls the communicator 21 to transmit the processing results of the self-diagnosis processing, the mutual-diagnosis processing, the separation of alarms, and the like to the controller 12 via the field network N1 (step S13). When the controller 12 receives such information, the controller 12 understands the overall state of the communication system 1 based on the information and notifies the understanding results to, for example, the host device 13.

As described above, in the present embodiment, the field devices 11a to 11d communicate each other via the local network N3, which is different from the field network N1 used in the basic operation, the predetermined processing (the preprocessing operation) is performed using the information obtained by performing the communication among the field devices 11a to 11 via the local network N3, and the processing results are transmitted to the controller 12. In other words, in the present embodiment, the field devices 11a to 11d perform processes, which are normally performed by the controller 12, and the processes are thereby distributed. Therefore, in the present embodiment, the load of the controller 12 can be reduced.

Figure 4:
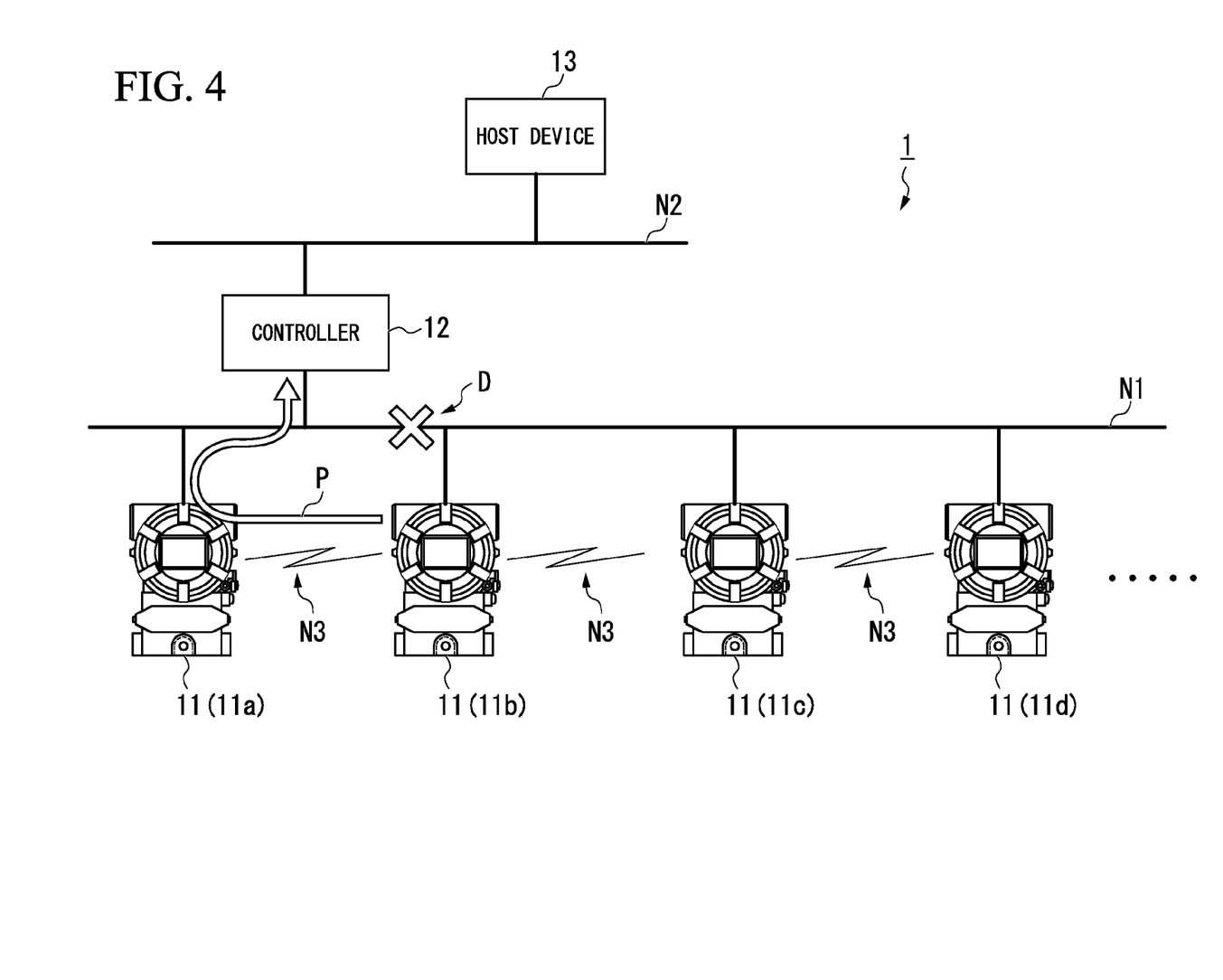
FIG. 4 is a diagram showing an operation when a communication failure occurs in the communication system according to the embodiment of the present invention.

The following descriptions will be made, assuming that a communication failure occurs in the communication system 1. FIG. 4 is a diagram showing an operation when a communication failure occurs in the communication system according to the embodiment of the present invention. FIG. 4 shows a case in which a failure D occurs such as a disconnection of a part of communication wire in the field network N1 and communication between the controller 12 and the field devices 11b to 11d is unavailable.

If such failure D occurs, for example, the field device controller 26 provided in the field device 11b cannot control the communicator 21 to communicate with the controller 12 via the field network N1. Therefore, the field device controller 26 provided in the field device 11b controls the local communicator 22 to communicate with the controller 12 via other field device 11 (the field device 11a in the example shown in the FIG. 4), which can communicate with the controller 12. In other words, in the example shown in the FIG. 4, the field device controller 26 provided in the field device 11b communicates with the controller 12 using a path P via the local network N3 and other field device 11. In the example shown in the FIG. 4, the field devices 11c and 11d, which cannot directly communicate with the controller 12, communicate with the controller 12 via the field device 11a in a similar way to the field device 11b.

As described above, in the present embodiment, the field devices 11a to 11d are connected to each other via the local network N3 in addition to the field network NI. Therefore, if a failure occurs in the field network N1 which is usually used, the communication via the local network N3 provided independently from the field network N1 is available. Thereby, a communication failure may be avoided.

Although the foregoing has been a description of a field device and a communication system according to an embodiment of the present invention, the present invention is not limited to this embodiment, and can be freely modified within the scope of the present invention. For example, although the above-described embodiment has been described for an example in which the local communicator 22 is preliminarily provided in the field device 11, the local communicator 22 may be an adaptor type and detachably attached to the field device preliminary provided in the plant.

Although the above-described embodiment has been described for an example in which the local network N3 is a wireless network, the local network N3 may be a cable network. If the local network N3 is a cable network, the field devices 11a to 11d may be connected to each other via a plurality of communication lines, which are physically-separated, or via one communication line.

What is claimed is:

1. A field device comprising:
a communicator configured to communicate with a control device via a first communication path;
a local communicator configured to communicate with another field device via a second communication path, which is different from the first communication path; and
a processor configured
to perform a predetermined information processing using at least one of first information related to the field device itself and second information obtained by communication between the local communicator and the another field device via the second communication path,
to share the first information and the second information with the another field device via the second communication path, and
to diagnose abnormal states of the field device and the another field device using the first information and the second information.

2. The field device according to claim 1, wherein the local communicator is configured to communicate with the another field device by at least one of cable communication and wireless communication.

3. The field device according to claim 1, wherein the processor is configured to perform a diagnosis processing as the predetermined processing, and the diagnosis processing diagnoses a state of at least one of the field device itself and the another field device using at least one of the first information and the second information.

4. The field device according to claim 1, wherein the processor is configured to perform a separation processing as the predetermined processing, and the separation processing separates alarms generated by at least one of the field device itself and the another field device using at least one of the first information and the second information.

5. The field device according to claim 1, wherein the processor is configured to perform the predetermined processing at constant time intervals.

6. The field device according to claim 1, further comprising a controller configured to control the communicator to transmit processing results of the processor to the control device via the first communication path.

7. The field device according to claim 6, wherein if the communicator fails to communicate with the control device via the first communication path, the controller is configured to control the local communicator to communicate with the control device via the another field device.

8. A communication system comprising:
a plurality of field devices; and
a control device configured to communicate with the field devices to control the field devices,
wherein:
each field device comprises:
a communicator configured to communicate with the control device via a first communication path;
a local communicator configured to communicate with another field device via a second communication path, which is different from the first communication path; and
a processor configured
to perform a predetermined information processing using at least one of first information related to the field device itself and second information obtained by communication between the local communicator and the another field device via the second communication path,
to share the first information and the second information with the another field device via the second communication path, and
to diagnose abnormal states of the field device and the another field device using the first information and the second information; and
the control device is configured to communicate with the field devices via the first communication path.

9. The communication system according to claim 8, wherein the local communicator is configured to communicate with the another field device by at least one of cable communication and wireless communication.

10. The communication system according to claim 8, wherein the processor is configured to perform a diagnosis processing as the predetermined processing, and the diagnosis processing diagnoses a state of at least one of the field device itself and the another field device using at least one of the first information and the second information.

11. The communication system according to claim 8, wherein the processor is configured to perform a separation processing as the predetermined processing, and the separation processing separates alarms generated by at least one of the field device itself and the another field device using at least one of the first information and the second information.

12. The communication system according to claim 8, wherein the processor is configured to perform the predetermined processing at constant time intervals.

13. The communication system according to claim 8, wherein each field device further comprises a controller configured to control the communicator to transmit processing results of the processor to the control device via the first communication path.

14. The communication system according to claim 13, wherein if the communicator fails to communicate with the control device via the first communication path, the controller is configured to control the local communicator to communicate with the control device via the another field device.

15. A method for controlling a field device, comprising:
transmitting and receiving, by a hardware processor, information among a plurality of field devices via a first network connecting the field devices;
performing, by the hardware processor, a predetermined processing in each field device using at least one of first information related to the field device itself and second information from another field device obtained by the transmittance and receiving of the information among the field devices; and
transmitting, by the hardware processor, processing results of the predetermined processing from each field device to a control device via a second network connecting each field device and the control device,
wherein
performing the predetermined processing comprises:
sharing the first information and the second information between the field device and the another field device via the first network; and
diagnosing abnormal states of the field device and the another field device using the first information and the second information.

16. The method according to claim 15, wherein the transmittance and receiving of the information among the field devices is performed by at least one of cable communication and wireless communication.

17. The method according to claim 15, wherein the predetermined processing includes a diagnosis processing diagnosing a state of at least one of the field device itself and the another field device using at least one of the first information and the second information.

18. The method according to claim 15, wherein the predetermined processing includes a separation processing separating alarms generated by at least one of the field device itself and the another field device using at least one of the first information and the second information.

19. The method according to claim 15, wherein the predetermined processing is performed at constant time intervals.

20. The method according to claim 15, wherein if a direct communication via the second network connecting one of the field devices and the control device is failed, communication between the one of the field devices and the control device via the another field device is performed.

* * * * *